United States Patent Office.

WILLIAM L. DUDLEY, OF COVINGTON, KENTUCKY, ASSIGNOR OF ONE-HALF TO JAMES P. WITHEROW, OF PITTSBURG, PENNSYLVANIA.

LINING FOR CONVERTERS AND FURNACES.

SPECIFICATION forming part of Letters Patent No. 350,921, dated October 19, 1886.

Application filed August 27, 1885. Serial No. 175,498. (No specimens.)

*To all whom it may concern:*

Be it known that I, WILLIAM L. DUDLEY, of Covington, in the county of Kenton and State of Kentucky, have invented a new and useful Improvement in Linings for Converters and Furnaces; and I do hereby declare the following to be a full, clear, and exact description thereof.

The object of my invention is the production of a neutral lining for furnaces, hearths, converters, and other vessels used for the treatment of molten iron, as distinguished from an acid or basic lining—that is, a lining which will not be attacked either by an acid or a base. In a vessel so lined the lining will not be wasted either by the silica in the iron or by basic additions, such as lime, &c., which are charged for the purpose of removing the phosphorus or other impurities in the bath.

Another object of my invention is to obtain a lining capable of resisting high temperatures.

My improved lining is composed of aluminium oxide with viscid carbonaceous matter.

The oxide is first calcined, if necessary, to drive off the water or any volatile substances which may be contained therein, and then pulverized, after which it is mixed with about ten per cent. of viscid carbonaceous material, such as tar, molasses, or other form. If tar is used, no water is added; but if other carbonaceous material which will mix with water is used a sufficient quantity of water is added, if necessary, to make the material more plastic. It is then molded into bricks of the proper form for lining the furnace or converter, and baked; or the furnace or converter is lined by ramming the material into place in the bottom or hearth, after which the lining is dried and burned in the usual way.

The proportion of the carbonaceous matter may be varied somewhat; but that given is preferred. If gas or other hydrous tar is used, it is first heated to drive off the water. When this lining material is molded into bricks, the bricks should be baked in iron molds, in which they are exposed to a high heat for a long period of time for the purpose of making them hard and enduring. The lining thus made is of a neutral character and will stand for a long time, thereby effecting a large saving in the trouble and expense of relining the furnace or other converting-vessel.

I am aware that a small percentage of alumina has been used in the manufacture of basic lining with a viscid carbonaceous material as a measure of economy and to increase the plasticity, as described in Letters Patent No. 218,336, granted to Sidney G. Thomas, August 5, 1879, and Letters Patent No. 218,315, granted to Edward Riley, August 5, 1879.

What I claim as my invention, and desire to secure by Letters Patent, is—

A neutral lining for furnaces, converters, and other vessels in which molten iron is treated, consisting of aluminium oxide and about ten per cent. of viscid carbonaceous material.

In testimony whereof I have hereunto set my hand this 25th day of August, A. D. 1885.

WILLIAM L. DUDLEY.

Witnesses:
R. H. WHITTLESEY,
THOMAS B. KERR.